United States Patent
Hirabayashi

[11] Patent Number: 5,963,342
[45] Date of Patent: *Oct. 5, 1999

[54] IMAGE PROCESSING APPARATUS AND METHOD THEREOF

[75] Inventor: Yasuji Hirabayashi, Kawasaki, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/544,194

[22] Filed: Oct. 17, 1995

[30] Foreign Application Priority Data

Oct. 19, 1994 [JP] Japan .................................. 6-253475

[51] Int. Cl.$^6$ ...................................................... H04N 1/40
[52] U.S. Cl. ............................ 358/456; 358/467; 358/426; 382/232
[58] Field of Search ..................................... 358/456, 462, 358/467, 426, 433, 455, 534, 539; 382/232, 234, 237

[56] References Cited

U.S. PATENT DOCUMENTS

| | | | |
|---|---|---|---|
| 4,668,995 | 5/1987 | Chen et al. | 358/426 |
| 4,694,352 | 9/1987 | Ina et al. | 358/257 |
| 5,072,291 | 12/1991 | Sekizawa | 358/456 |
| 5,309,254 | 5/1994 | Kuwabara et al. | 358/456 |
| 5,361,147 | 11/1994 | Katayama et al. | 358/462 |
| 5,371,606 | 12/1994 | Katayama et al. | 358/400 |
| 5,701,367 | 12/1997 | Koshi et al. | 382/232 |

FOREIGN PATENT DOCUMENTS

| | | | |
|---|---|---|---|
| 1179778 | 12/1984 | Canada | H04N 1/40 |
| A-42981 | 1/1982 | European Pat. Off. | H04N 1/40 |
| 2308262 | 11/1976 | France | H04N 1/00 |
| 3573229 | 5/1986 | France | G06F 15/66 |
| 1549739 | 8/1979 | United Kingdom | H04N 1/00 |

OTHER PUBLICATIONS

"Algorithms For Coding Scanned Halftone Pictures", S. Forchhammer et al., 9th International Conference on Pattern Recognition, Nov. 14–17, 1988, Rome Italy, vol. 1, 1988, IEEE (US) pp. 297–299.

"Review of Standards For Electronic Imaging For Facsimile Systems", S.J. Urban, Journal of Electronic Imaging, vo. 1, No. 1, Jan. 1992, Bellingham, WA (US), pp. 5–21, XP000323323.

*Primary Examiner*—Thomas D. Lee
*Attorney, Agent, or Firm*—Fitzpatrick, Cella, Harper & Scinto

[57] ABSTRACT

An object of the present invention is to data compress a binary image which includes a pseudo expressed halftone image effectively. To attain this object, an image processing apparatus of the present invention comprises region division means for dividing an input binary image data into a region of a pseudo expressed halftone image portion and a region of another portion, first encoding means for generating multi-value image data from binary image data of said pseudo expressed halftone image portion and encoding the obtained multi-value image data, second encoding means for encoding at least a part of the binary image data from a portion other than the pseudo expressed halftone image portion.

17 Claims, 9 Drawing Sheets

CONTENTS OF LUT 19

FIG. 5

| 1 | 2 | 4 | 2 | 1 |
|---|---|---|---|---|
| 2 | 4 | 8 | 4 | 2 |
| 4 | 8 | 16 | 8 | 4 |
| 2 | 4 | 8 | 4 | 2 |
| 1 | 2 | 4 | 2 | 1 |

EXAMPLE OF MATRIX M(j,i)

FIG. 6

EXAMPLE OF MULTIPLEXER OUTPUTS

IMAGE PROCESSING APPARATUS AND METHOD THEREOF

BACKGROUND OF THE INVENTION

1. Field of the Invention

The present invention relates to an image processing apparatus and method for encoding and decoding an input binary image.

2. Related Background Art

Hitherto, various image encoding systems have been proposed. Most of the systems are based on a fundamental technique in the field of such encoding system, and some of the systems are based on an advanced complex technology combined with the foregoing fundamental technique. As of today, systems of MMR, JBIG, JPEG, MPEG and the like belonging to an International Standardized System correspond to such latter advanced system.

A brief description is given hereinafter as to the JBIG and JPEG. The JBIG regulates a system of hierarchical encoding of a binary image. Image data are "lossless" encoded, and a reproduced image becomes the same image as that of an original image. In this point, the JBIG is the same system as that of MH, MR or MMR utilized in a facsimile apparatus. An advantage of the JBIG system against a Facsimile system is that, in the Facsimile system, a compressive efficiency of a pseudo-expressed halftone image having the different statistic distribution is resulted in a bad efficiency because this system utilizes a run-length encoding based on run statistic, while in the JBIG system, the foregoing halftone image can be also compressed because this system utilizes an arithmetic encoding.

The JPEG system is a compression system of a multi-value (or multi-level) gradation image, and is a non-reversible encoding. This system can vary a compressive ratio depending on set parameters and the quality of a reproduced image is varied corresponding to such a variation. The JPEG system can not "lossless" encode data theoretically, however, it is possible to obtain the quality of a reproduced image of which deterioration can not be visually detected.

Next, the applicable field of the JBIG, JPEG and run-length encoding system will be briefly described. Since the oldest practical run-length encoding system is a reversible encoding system of binary data, any kind of digital data can be fundamentally dealt with. However, if it is considered to perform the most effective compression, the run-length encoding system is still fitted to the compression of binary image data utilized in a facsimile apparatus or the like. On the other hand, although some problems remain in the efficiency, it is possible to utilize the run-length encoding system for multi-value image data. As the practical use, for example, if only a CODEC for a facsimile apparatus is provided, such case as requiring to transfer multi-value gradation image data with lossless by utilizing the provided CODEC is considered. In this case, multi-value data is separated into bit planes and each of the separated data is encoded. If a multi-value image is separated into the bit plates, since a spatial correlation becomes weak except the most significant bit. Thus, when this method is utilized, generally, a conversion to a gradation expression utilizing a gray code is conducted. In this way, the multi-value data can be lossless encoded, however, even if the gray code is utilized as mentioned above, an entropy becomes extremely high level as to the lower bit, therefore, it becomes difficult to obtain a compressive efficiency.

The JBIG system, similarly to the run-length encoding, serving as the lossless encoding of the binary data can be utilized not only as an application of encoding of an image which is applicable to the run-length encoding but also adopts the hierarchical encoding, so that an excellent adaptation is held to, what is called, a soft-copying communication (communication of images between display terminals, and this communication is used to get access to the data base including images).

As described above, since the compression of the JBIG system does not depend on any statistic distribution of the binary data, any kind of source data can be compressed, and a compressive efficiency in the worst situation becomes 1. Therefore, even if data which does not include the large correlation/redundancy like an image is a source, an effect of the compression can be surely obtained. This fact means that the JPEG system can be reliably used even if a great deal of data exist because there is no any other effective reversible compression means.

The JPEG system has different idea from the foregoing two systems fundamentally in a point that this system is a non-reversible compressive system. Therefore, this system is limited to be used only when the non-reversible compressive system may be adopted. Since the JPEG system encodes data utilizing the redundancy of the multi-value gradation image as maximumly as possible, it is impossible to apply this system to the encoding of a binary image as it is.

As of today, under the situation that many facsimile apparatuses have been widely used, a technology for encoding the binary image becomes more important. An encoding system utilized, nowadays, in such field is the run-length encoding, and the encoding to be utilized in future in such field is the JBIG system.

Even if which of these systems is utilized, a large code compressive ratio with the almost same level can be obtained in encoding character images which have been most treated conventionally. In this case, a compressive ratio may be about one per several tens.

Recently, the case for transferring a pseudo gradation image becomes more frequently in accordance with the great improvement of the resolution of a reading apparatus (scanner) and a recording apparatus (printer). Originally, an image with low entropy depending on a dither method has been utilized. However, recently, the pseudo gradation image depending on random-dots generated by an ED (error diffusion) method or MD (mean difference minimization) method becomes to be widely used. If these random-dots having an extremely high-level entropy are run-length encoded, in the worst case, it cannot be denied that the code length becomes several times as long as that of an original image. If a random-dot image is encoded by the JBIG system, it is certainly possible to compress data as mentioned before. However, in this case, a compressive ratio does not exceed 2. Almost cases, the compressive ratio becomes 0.1 to 0.9. That is, the compressive ratio of an entire image is extremely reduced if only a small-sized pseudo gradation portion is included in an ordinary character image. This is because, the character data occupies almost part of an image is compressed to one per several tens, while the pseudo gradation image occupies only about 10% of an entire image is compressed only to about 0.6, so that, codes caused by the pseudo gradation image becomes more influential under the case of comparing with the code condition.

In the JBIG system, data of the pseudo gradation image can be compressed a little. However, contrary to this fact, when the run-length encoding system is utilized, data of the pseudo gradation image portion will be often increased inversely. Therefore, the pseudo gradation image data becomes more influential.

SUMMARY OF THE INVENTION

An object of the present invention is to compress data of a binary image which includes a pseudo expressed halftone image effectively.

In order to attain the foregoing object, according to a preferable embodiment of the present invention, an image processing apparatus comprises: input means for inputting binary image data, region division means for dividing an image indicated by the binary image data input by said input means into a region of a pseudo halftone image portion and a region of another portion, first encoding means for generating multi-value image data from the binary image data which indicates the pseudo halftone image portion and encoding obtained multi-value image data, and second encoding means for encoding the binary image data which indicates at least a part of another portion of said pseudo halftone image portion.

Other objects and features of the present invention will become apparent from the following embodiments and the attached drawings.

DETAILED DESCRIPTION OF THE PREFERRED EMBODIMENTS

[First Embodiment]

In an embodiment of the present invention described hereinafter, a binary image which includes a binary pseudo expressed halftone image (referred to as a pseudo halftone image hereinafter) is divided into a region of a pseudo halftone image portion and a region of another portion, and a non-reversible multi-value (or multi-level) encoding is conducted to the pseudo halftone image portion after generating multi-value image data, while a binary encoding is conducted to another portion, thereafter, region division information is generated together with codes obtained by the above-mentioned manner. As a result, an entire compressive efficiency is to be improved by conducting a non-reversible encoding to the pseudo halftone image portion. In case of decoding, multi-value encoded data is re-binarized after decoding it. Thus, processed data is superimposed to an ordinary binary decode image in accordance with the region division information to terminate an output.

The embodiment of the present invention will be described in detail hereinafter with reference to the accompanying drawings.

Figure 1:
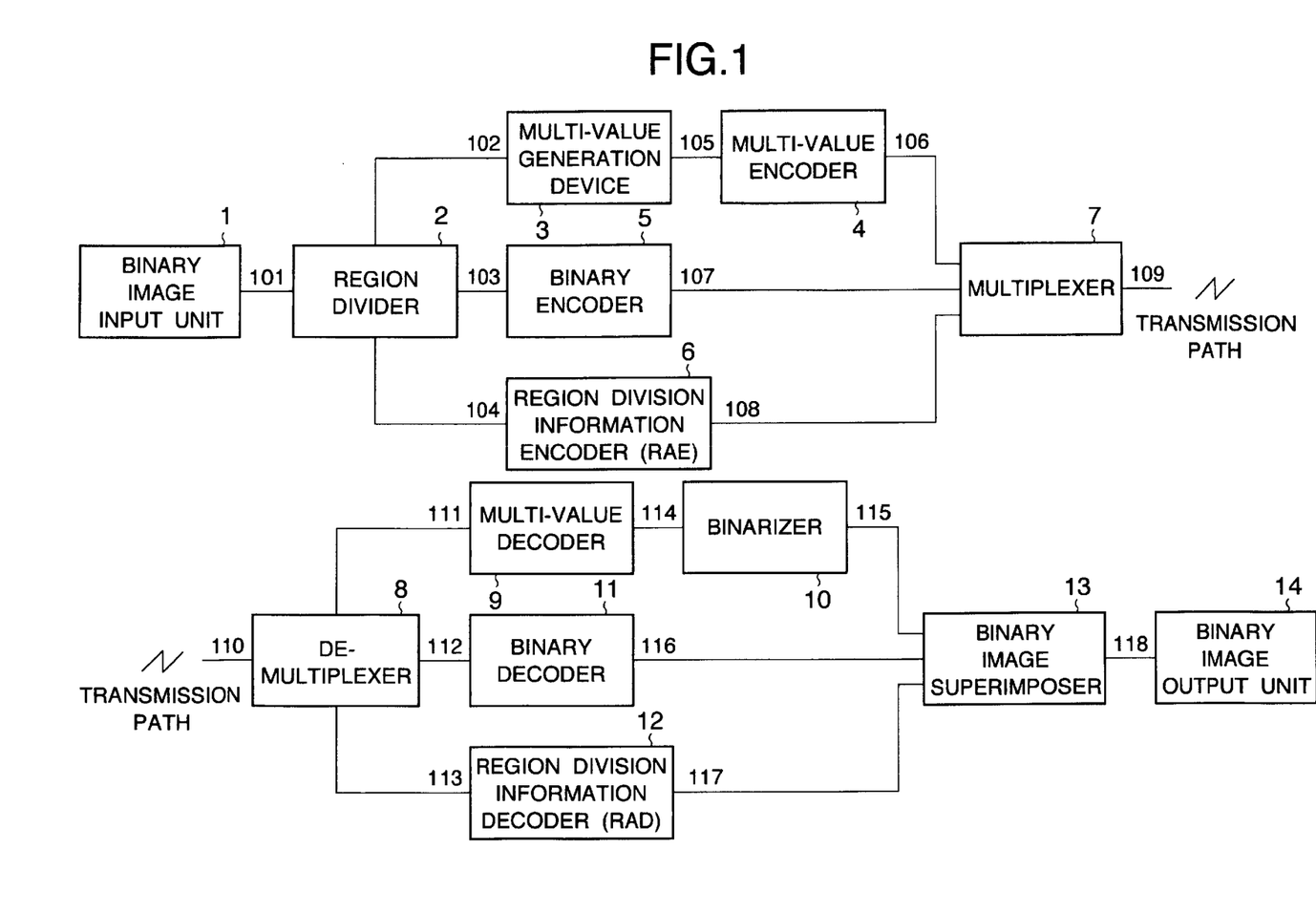
FIG. 1 is an entire block diagram of an encoder and a decoder of a binary image common to first to third embodiments of the present invention.

FIG. 1 is an entire block diagram of a binary image encoder/decoder of the present embodiment.

In FIG. 1, a binary image input unit 1 fetches binary image data, a region divider 2 divides a region to process an input binary image for each divided region, a multi-value generation device 3 generates multi-value image data from the binary image data, a multi-value encoder 4 encodes the multi-value image data, a binary encoder 5 encodes the binary image data, a region division information encoder 6 (referred to as a RAE hereinafter) encodes region division information generated when a region is divided, a multiplexer 7 arranges plural data previously in the order of being set to output them, a demultiplexer 8 divides input data and outputs them to target devices of each data, a multi-value decoder 9 corresponds to the multi-value encoder 4, a binarizer 10 converts the multi-value image data into the binary image data, a binary decoder 11 corresponds to the binary encoder 5, a region division information decoder 12 (referred to as a RAD hereinafter) corresponds to the RAE 6, a binary image superimposer 13 superimposes a binary image and a binary image output unit 14 outputs the binary image data.

Figure 2:
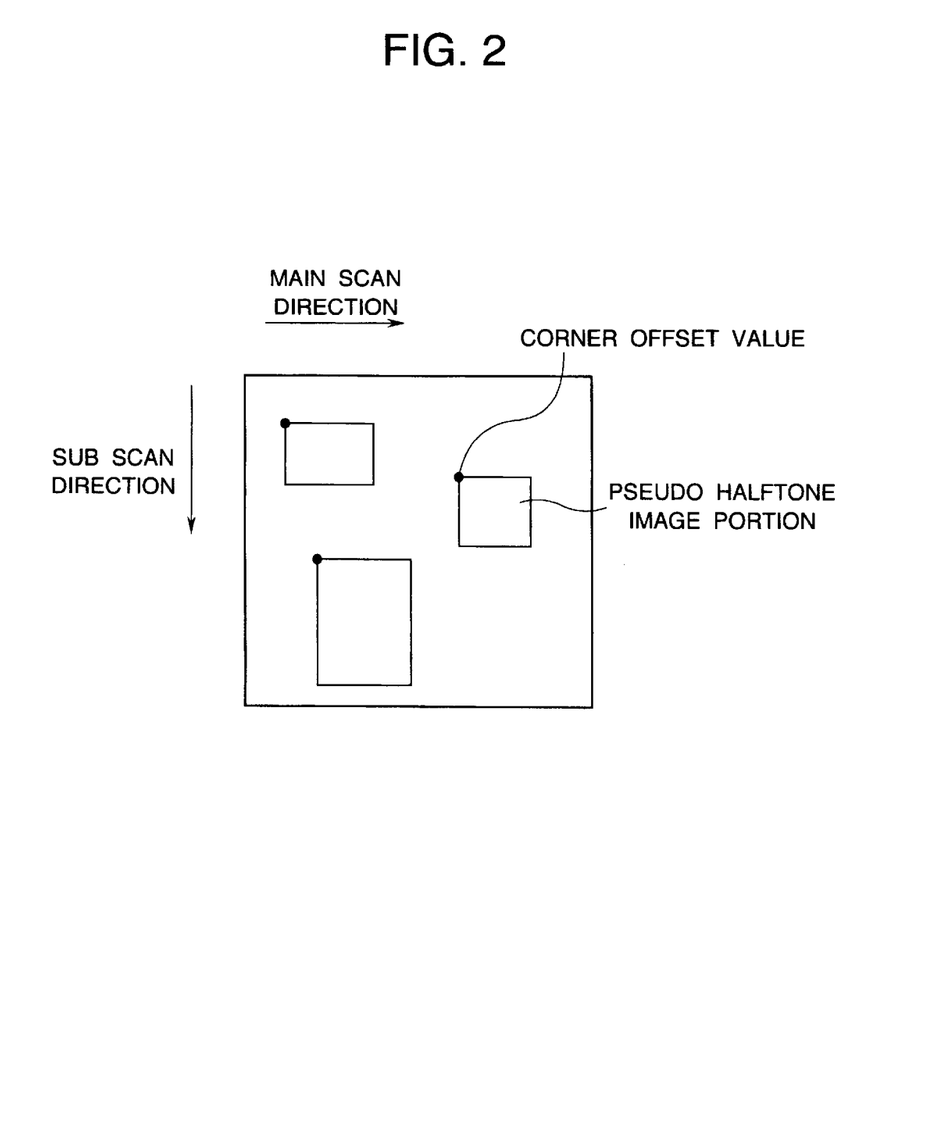
FIG. 2 shows state for cutting out a pseudo expressed halftone image from an input binary image as a rectangular region.

Binary image data 101 input from the binary image input unit 1 is divided into a pseudo halftone image portion and another portion in the region divider 2. An example of the region divider will be described later. At this time, it is assumed that an image discriminated as the pseudo halftone image portion is cut off with the shape of rectangular and at the same time, such region division information 104 as a corner offset value (one dot coordinate of a corner which is previously and optionally set from four corners of a cut-out rectangular portion) in a screen of a rectangular region which is cut off as shown in FIG. 2, a rectangular size, numbers of cut off rectangular region and the like are generated. Binary image data 103 from which a rectangular region is cut off includes an empty portion, to which data of 0 (without image) is assigned. Rectangular region data 102 which is cut off is transferred to the multi-value generation device 3.

The multi-value generation device 3 generates the multi-value image data from the rectangular region data 102 to output it to the multi-value encoder 4. The method of generating the multi-value image data will be described later. The multi-value encoder 4 conducts the JPEG encoding being a non-reversible compression with the block unit utilizing an orthogonal conversion to output multi-value code data 106. The JPEG encoding system has been already known, thus the description will be omitted. The binary encoder 5 encodes an image, from which the rectangular region data 102 is eliminated, with high efficiency by the JBIG encoding system to output binary code data 107. The RAE 6 encodes numbers of rectangular region, the corner offset value and the rectangular size to output code data 108.

The multiplexer 7 has therein a code buffer (not shown) and holds code data 106 to 108. Upon terminating the encoding of an entire screen data, code data 109 composed of these data arranged with appropriate order is output to a transmission path. In this case, the multiplexer 7 adds header data including the data size or the like and the marker indicating the edge of three kinds of data. Here, an example of outputting method of the code output 109 will be shown in FIG. 6.

Figure 6:
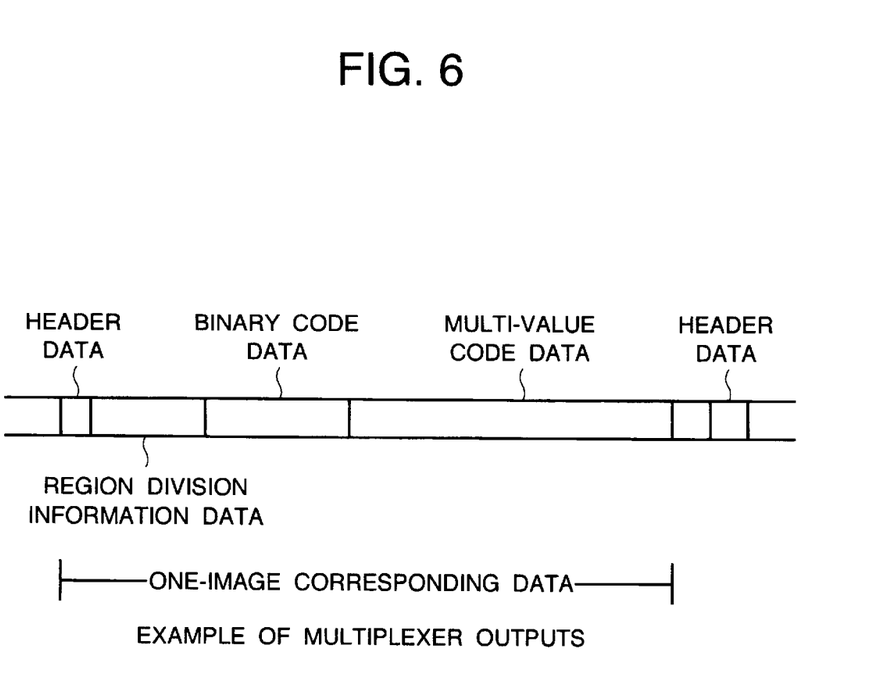
FIG. 6 indicates state of data in case of outputting code data to a transmission path from a multiplexer 7.

In FIG. 6, the header data which is a head of data includes size information of data corresponding to one image or the like. Then, the region division information data which is required to superimpose the multi-value code data 106 and the binary code data 108 as a binary image at decoding side is output. Then, the binary code data seemed to have little data against the size of an image is output. By outputting this binary code data at first, if the binary image output unit 14 at the code data reception side is a monitor or the like, there obtains such advantage as an outline of an image can be quickly discriminated. Then, the multi-value code data having a lot of data against the size of an image is output. As shown in FIG. 6, the marker indicating the edge of data is inserted among each data. Here, data are output in the order as shown in FIG. 6 by treating one image as one block, however, it is possible to output data with the block unit or with the different order from that of FIG. 6 and other data may be included therein.

Next, an operation of a decoder shown in the lower portion of FIG. 1 will be described. Code data 110 is input to the demultiplexer 8 from a transmission path. The demultiplexer 8 divides data stream in accordance with header information or the like added by the multiplexer 7. Among divided data, multi-value code data 111 is input to the multi-value decoder 9, binary code data 112 is input to the binary decoder 11 and region division information data 113 is input to the RAD respectively.

The binary decoder 9 conducts the JPEG decoding to the multi-value code data 111 to output multi-value image data 114. The binarizer 10 re-binarizes the multi-value image data 114 by a pseudo halftone process (ED method or the like is utilized) to output image information 115. The binary decoder 11 conducts the JBIG decoding to the binary code data 112 to output binary image data 116. The RAD 12 decodes a coordinate to which the cut-off rectangular region is to be applied, the size of a region and numbers of rectangular to output region division information 117. The superimposer 13 superimposes the pseudo halftone image data 115 to the binary image data 116 in accordance with the region division information 117 to synthesize one binary image 118 which is output to the binary image output unit 14. The binary image output unit 14 may be an image output device of an electrophotographic system, a recording system using a type of head discharging ink droplets by utilizing film boiling caused by heat energy (what is called a bubble jet system), or another type of image output devices such as a printer, a monitor and the like.

Figure 3:
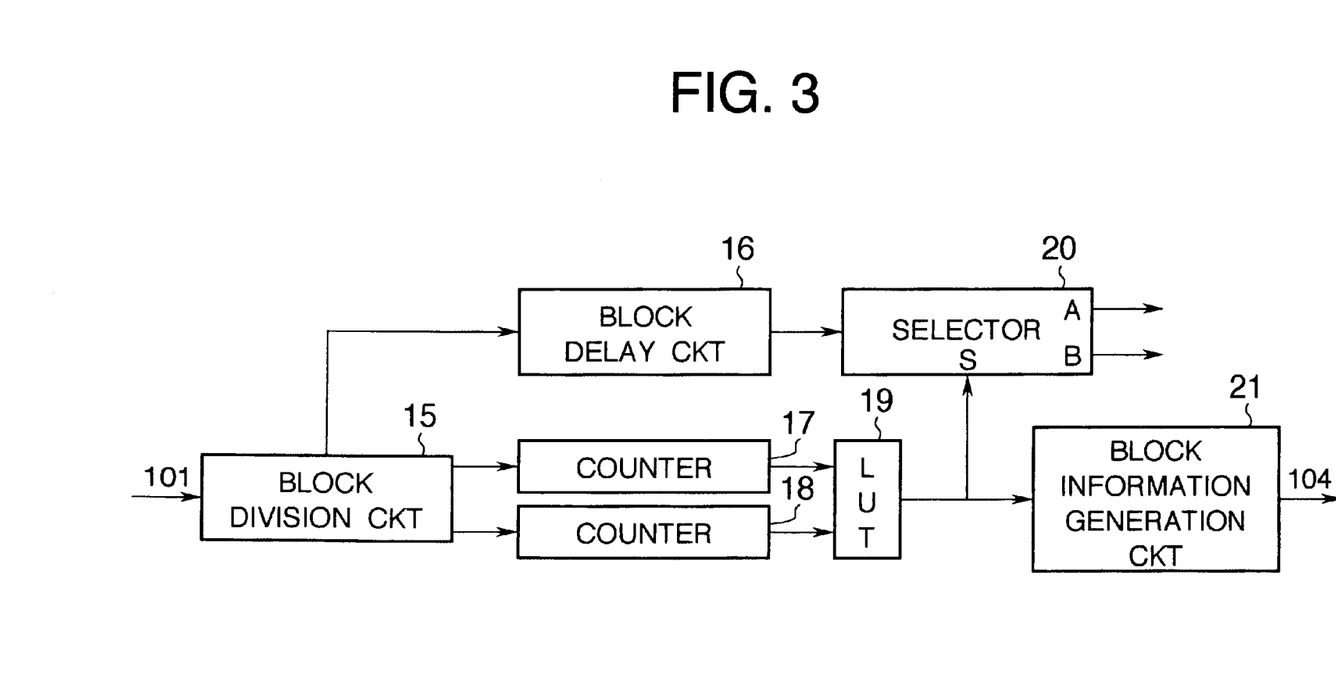
FIG. 3 is a block diagram showing an example of a region divider 2.

Next, an example of the region divider 2 is shown in FIG. 3. The binary image data 101 input from the binary image input unit 1 is divided into the block unit of n×n pixels in a block division circuit 15 to be output to a block delay circuit 16, counters 17 and 18 in the block unit. The counter 17 outputs the number of black pixels in a block, and the counter 18 counts the number of inversion between the white pixel and the black pixel among adjacent pixels every vertical/horizontal line in a block and outputs the summed-up value of number. As to two counters, the number of counters and the combination of parameters may not be limited to the above-mentioned example but may be another manner which can discriminate the pseudo halftone image portion from another portion.

Figure 4:
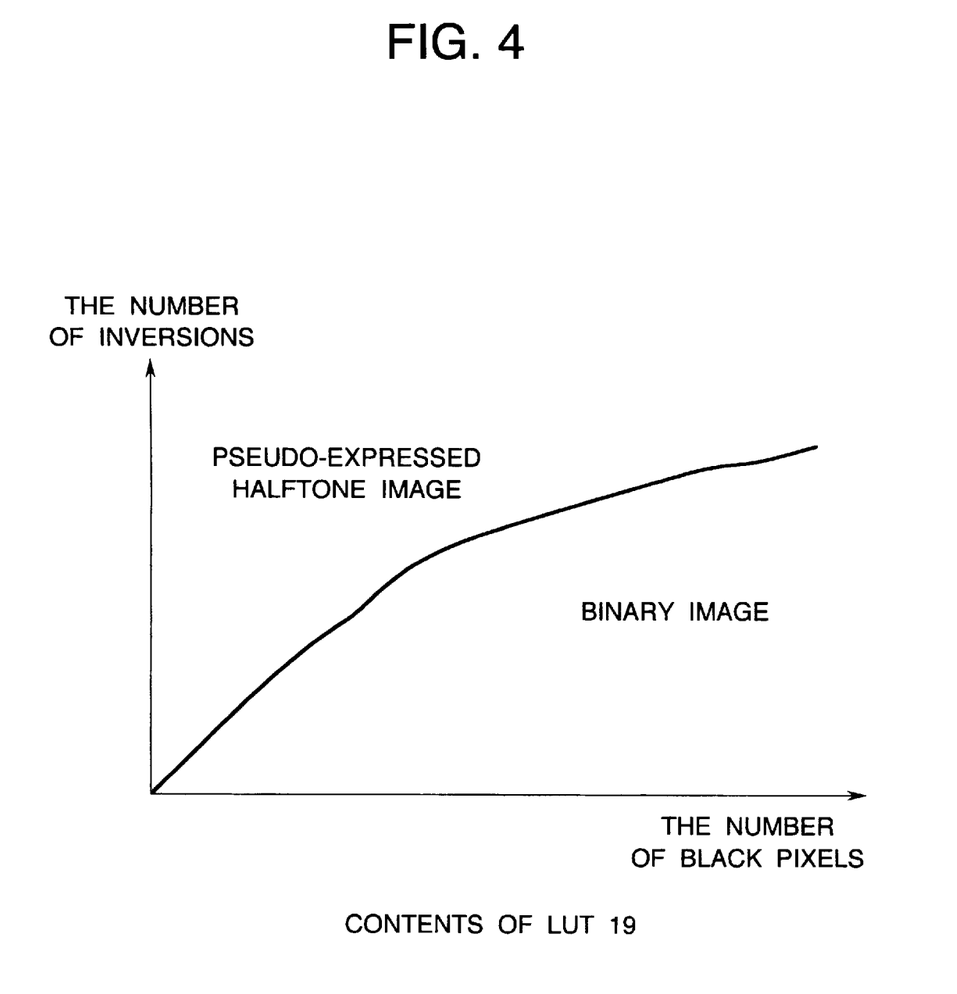
FIG. 4 is a view for explaining an operation of a LUT 19 shown in FIG. 3.

A look up table 19 (referred to as a LUT hereinafter) inputs the summed-up value of counters 17 and 18, thereafter outputs a signal which can discriminate the pseudo halftone image portion from another portion based on a graph shown in FIG. 4. A selector 20 switches an output destination of the block-unit information which is output from the block delay circuit 16 to A side when the pseudo halftone image is processed, and to B side when the character image is processed, in accordance with an output from the LUT 19. A block information generation circuit 21 generates and outputs the region division information data 104, based on the information switched at this time.

Figure 5:
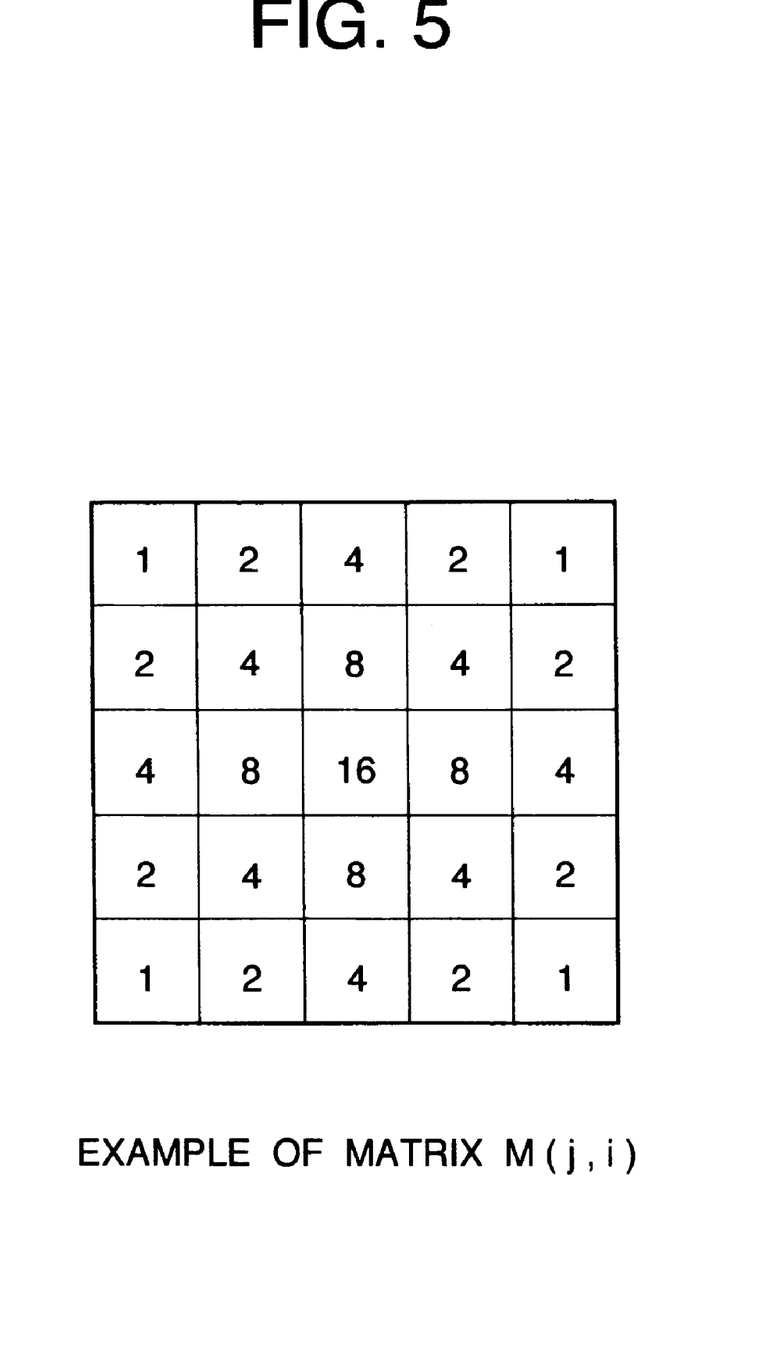
FIG. 5 indicates coefficient matrix utilized in generating multi-value image data from a binary image.

An operation of the multi-value generation device 3 will be described with reference to FIG. 5. The pseudo halftone image portion which is cut off as the rectangular region is remarked, sequentially from its left upper corner to its right lower corner, every pixel. The 5×5 pixels around the objective pixel (target pixel) are cut off, and then assumed to be a coordinate P (j, i). By utilizing this coordinate P (j, i) and matrix M (j, i) shown in FIG. 5, the multi-value v for the objective pixel is defined by the following equation.

$$v = \sum_j \sum_i M(j, i) \times P(j, i) \times 255 / 100$$

when P (j, i)=0 . . . white pixel
when P (j, i)=1 . . . black pixel

In this manner, the multi-value data is generated from the binary data in the rectangular region. With the foregoing description, the first embodiment is concluded. According to the present embodiment, with maintaining the same size, the multi-value data is generated from the binary image which is cut off as the rectangular shape. Therefore, simply, the data becomes eight times as large as before.

If it is taken into the consideration that the data is compressed to about 0.6 bit/pixel when an original data, that is, 1 bit/pixel of the pseudo halftone image data is encoded by the JBIG system as it is, at least a compressive ratio equal to or larger than 1/20 is required in case of compressing the foregoing eight-time enlarged data by the JPEG system. This compressive ratio can be easily realized by setting the quantizing parameters or the like in the JPEG compression system. Therefore, according to the first embodiment, a binary image which includes a pseudo halftone image can be easily and effectively compressed as compared with the conventional system.

[Second Embodiment]

The structure of an entire block in the second embodiment of the present invention is same as that of the first embodiment. A different point is observed in an internal operation of a multi-value encoder 4 and a multi-value decoder 9 shown in FIG. 1.

In the first embodiment, an image from which the multi-value data is generated by a multi-value generation device 3 is directly encoded in the multi-value encoder 4. On the other hand, in the second embodiment, multi-value image data is DPCM encoded after sub-sampling to the resolution of 1/4 every vertical/horizontal line.

It has been known that when a multi-value image having the different resolution of which value is multiplied by about 2 to 4 is binarized by an ED method, the quality of the binary image to be output does not have a great difference in its quality. (However, a simple enlargement is conducted before binarization to have the same resolution.) The present embodiment utilizes the above-mentioned fact. The data which is increased to have the capacity of 8 bits/pixel data because of being transformed to the multi-value image data is compressed to the data of which capacity decreased to 1/16 by the sub-sampling of 1/4 every vertical/horizontal line. By conducting the lossless DPCM encoding to the data processed as above, the compressive ratio of about 1/2 can be further expected. Finally, the data can be compressed to about the capacity of 0.25 bit/pixel or so.

Of course, thus obtained compressive ratio becomes more effective as compared with the prior JBIG, MR system or the like.

In the second embodiment, the multi-value decoder 9 shown in FIG. 1 is a DPCM decoder, and a binarizer 10 generates the DPCM decoded pixel four times repeatedly every vertical/horizontal line before binarization to interpolate the sub-sampled data.

[Third Embodiment]

Similar to the second embodiment, the third embodiment differs from the first embodiment as to the internal operation of a multi-value encoder 4 and a multi-value decoder 9. In the third embodiment, the JPEG encoding system is utilized again in the multi-value encoder 4, however, the different point from the second embodiment is that a multi-value image is sub-sampled to 1/2 every vertical/horizontal line before conducting the JPEG encoding. According to this process, the data increased from the capacity of 1 bit/pixel to the capacity of 8 bits/pixel is compressed to the capacity of 2 bits/pixel.

On the other hand, by adjusting the compressive ratio of the JPEG encoding only to 1/4, it is possible to exceed the compressive ratio depending on the prior system. In this case, it can be expected that multi-value image data which is JPEG decoded in the multi-value decoder 9 becomes the high quality image data.

Before the JPEG encoding, by adjusting the compressive ratio of the JPEG encoding to about 1/10 depending on the sub-sampling of 1/4 every vertical/horizontal line, the compressive ratio almost similar to that of the ordinary character image can be obtained.

In the first to the third embodiments of the present invention, the multi-value encoding system in the multi-value encoder 4 is not limited to the JPEG encoding, but it can be used another multi-value encoding such as a vector quantization, an orthogonal conversion encoding or the like. Also, the binary encoding in a binary encoding 5 is not limited to the JBIG encoding, but it can be used another binary encoding system such as MH, MR, MMR or the like.

Further, in the first to the third embodiments of the present invention, an entire portion other than a pseudo expressed halftone image portion which is region divided in a region divider 2 is binary encoded in the binary encoder 5. However, without limiting to such method, it is considered that a part other than the pseudo expressed halftone image portion may be binary encoded by the binary encoder 5, and another encoding system (for example, conducting the encoding depending on the recognition of characters) may be utilized to the expected binary image portion.

[Example of another modification]

Figure 7:
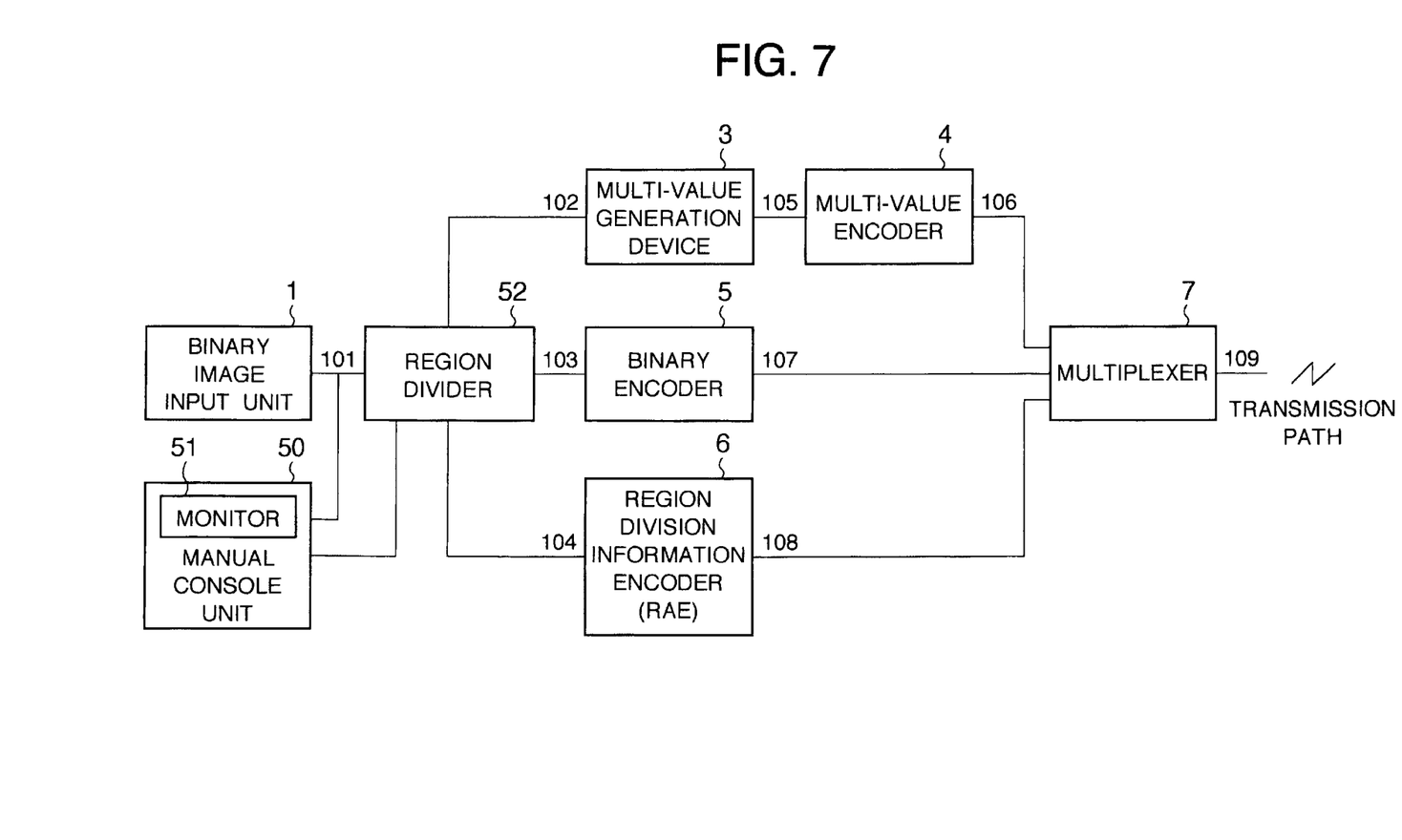
FIG. 7 shows an example of a modified block of an encoder shown in FIG. 1.
Figure 8:
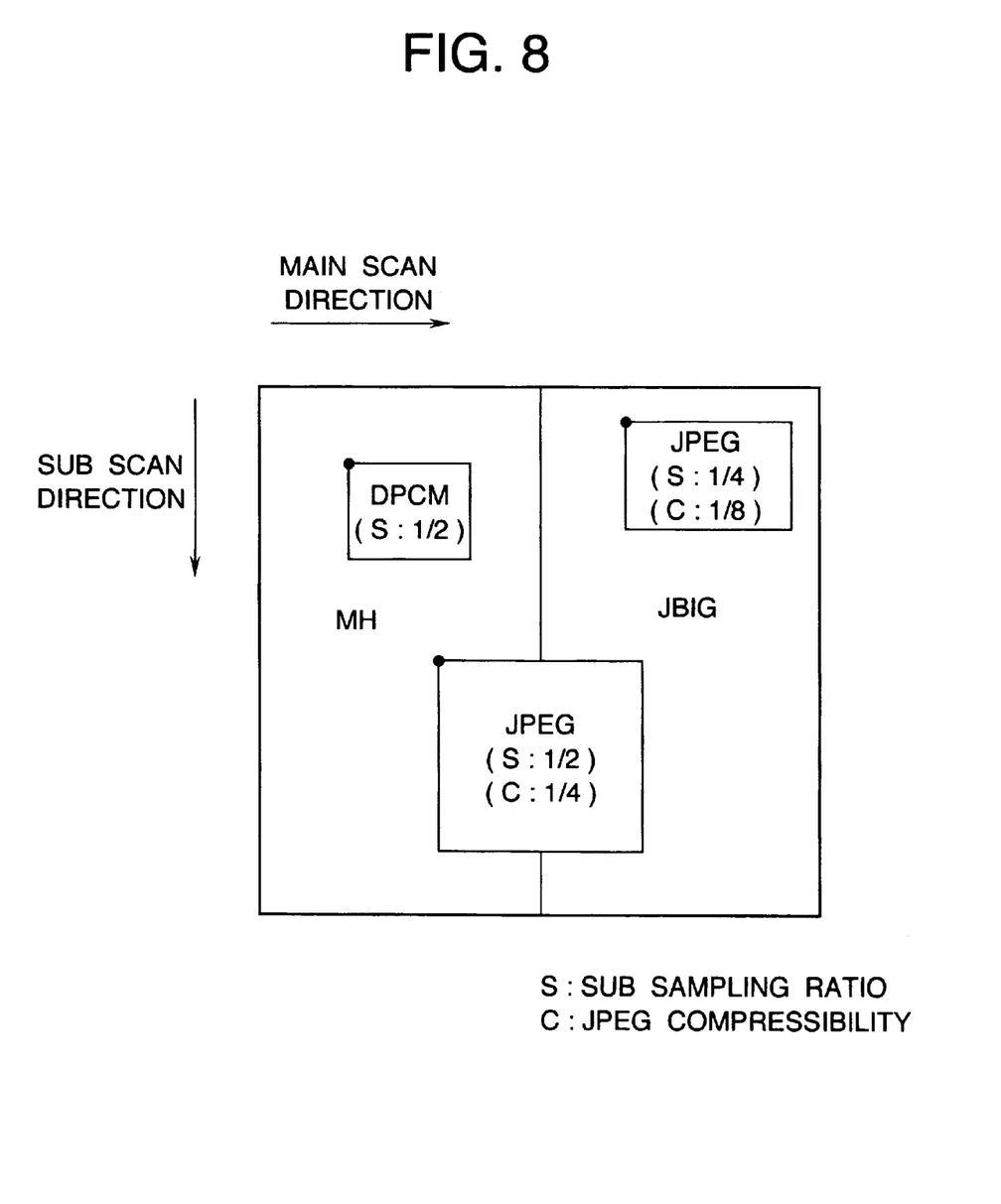
FIG. 8 shows state for designating a region of an input binary image.

A modified example of the first to the third embodiments of the present invention is shown in FIG. 7. In FIG. 7, a different point from the block diagram shown in FIG. 1 is to have a manual console unit 50. The manual console unit 50 displays binary image data input from a binary image input unit 1 by using a monitor 51. According to this displayed image, a region divider is controlled by the manual operation. That is, instead of an automatic region division operation conducted by a region divider 2 shown in FIG. 1, the region division operation is controlled by the manual operation. A region divider 52 distributes the binary image data input from the binary image input unit 1 into the data 102 and 103 based on a control signal from the manual console 50 and outputs the encoding parameter described later. Thereafter, the same process as that of the first to the third embodiments is executed. The manual console unit 50 can designate not only a pseudo halftone image region and another binary image region but also the encoding parameters such as the encoding method (DPCM, JPEG, MR or the like), the foregoing sub-sampling ratio (1/2 or 1/4 etc), the JPEG compressive ratio or the like for each designated region independently. According to the present invention, the encoding parameter can also be assigned to each region as shown in FIG. 8, and an example of an encoder in such case is shown in FIG. 9.

Figure 9:
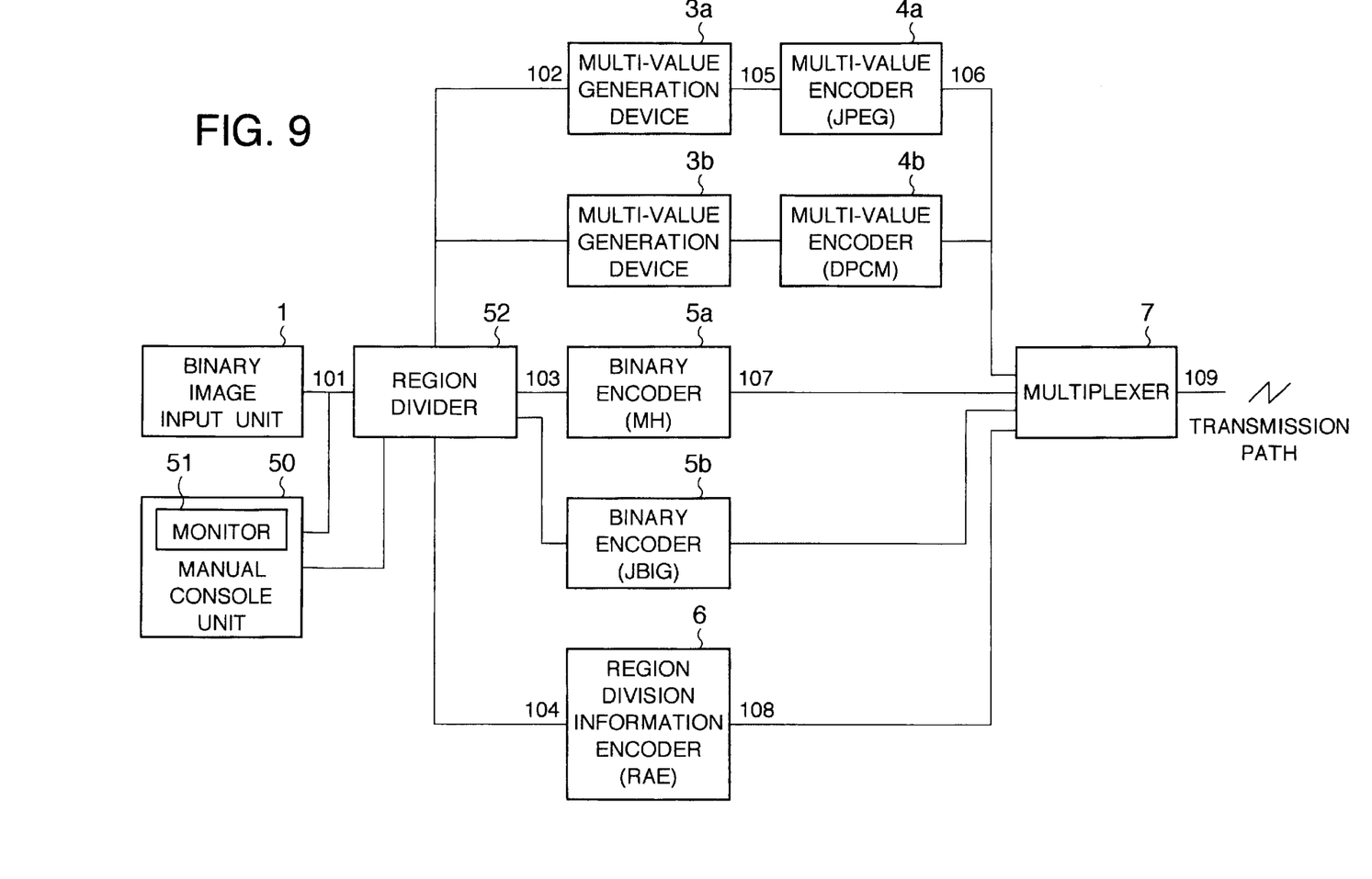
FIG. 9 shows an example of a modified encoder shown in FIG. 1, which enables to designate a region and encoding parameters indicated in FIG. 8.

In FIG. 9, a different point from that of FIG. 7 is that plural multi-value generation units 3, multi-value encoders 4 and binary encoders 5 are provided. Another structure in FIG. 9 is same as that of FIG. 7. With the above, the description of an example of another modification is concluded. When the encoding is conducted by a computer, the algorithm of encoding utilized in the above each embodiment may be stored in various storing mediums such as the floppy disk or the like as the program to be read out by a computer for encoding the data.

As described above, according to the present invention, a binary image including a pseudo-expressed halftone image of which high compressive ratio can be barely obtained conventionally can be data compressed effectively.

The present invention can be modified in various manners, within the scope of following claims.

What is claimed is:

1. An image processing apparatus comprising:

input means for inputting binary image data representing one picture including a plurality of pixels, wherein a value of each pixel of the binary image data has one of only two possible states;

region division means for dividing the one picture into a pseudo halftone image portion and another portion;

first encoding means for generating multi-value image data from the binary image data which indicates the pseudo halftone image portion, wherein the value of each pixel of the multi-value image data has one of more than two possible states, said first encoding means encoding the obtained multi-value image data; and second encoding means for encoding the binary image data which indicates at least a part of the other portion.

2. An apparatus according to claim 1, wherein said region division means divides the image into portions with a block unit of n×n pixels.

3. An apparatus according to claim 1, wherein said first encoding means performs a non-reversible encoding and said second encoding means performs a reversible encoding.

4. An apparatus according to claim 1, wherein said first encoding means performs a non-reversible encoding of the multi-value image data in units of a block and said second encoding means performs a reversible encoding of the binary image data which indicates at least the part of the other portion in units of a line.

5. An apparatus according to claim 1, wherein a region division performed by said region division means is conducted in response to a manual operation.

6. An apparatus according to claim 1, further comprising display means for displaying a binary image input by said input means.

7. An apparatus according to claim 1, further comprising:

reception means for receiving second multi-value image data indicating a multi-value portion of a second image including a plurality of second pixels, wherein a value of each second pixel in the multi-value portion is indicated in the multi-value code, said reception means further receiving second binary image data indicating a second other portion of the image, wherein a value of each second pixel in the second other portion is indicated in the binary code;

binarization means for decoding the second multi-value image data into decoded binary image data wherein the value of each second pixel is indicated in the binary code and generating a second pseudo halftone image from the decoded binary image data;

decoding means for decoding the second binary image data to generate a decoded binary image; and superimposing means for superimposing the second pseudo halftone image on the decoded binary image.

8. An apparatus according to claim 7, wherein said superimposing means conducts the superimposing in accordance with region information received by said reception means.

9. An apparatus according to claim 1, wherein said output means is a printer which utilizes a head of a type for discharging ink droplets by film boiling caused by heat energy and utilizes a recording method using a head.

10. An image processing method comprising:

an input step of inputting binary image data representing one picture including a plurality of pixels, wherein a value of each pixel of the binary image data has one of only two possible states;

a region division step of dividing the one picture into a pseudo halftone image portion and another portion;

a first encoding step of generating multi-value image data from the binary image data which indicates the pseudo halftone image portion, wherein the value of each pixel of the multi-value image data has one of more than two possible states, said first encoding step encoding the obtained multi-value image data; and a second encoding step of encoding the binary image data which indicates at least a part of the other portion.

11. An image processing apparatus comprising:

input means for inputting binary image data representing one picture including a plurality of pixels, wherein a value of each pixel of the binary image data has one of only two possible states;

determination means for determining a portion to be multi-value encoded and a portion to be binary encoded from the one picture;

conversion means for converting the binary image data of the portion to be multi-value encoded into multi-value image data, wherein the value of each pixel of the multi-value image data has one of more than two possible states;

first encoding means for multi-value encoding the multi-value image data; and second encoding means for binary encoding the binary image data of the portion to be binary encoded.

12. An image processing method comprising:

an input step of inputting binary image data representing one picture including a plurality of pixels, wherein a value of each pixel of the binary image data has one of only two possible states;

a determination step of determining a portion to be multi-value encoded and a portion to be binary encoded from the one picture;

a conversion step of converting the binary image data of the portion to be multi-value encoded into multi-value image data, wherein the value of each pixel of the multi-value image data has one of more than two possible states;

a first encoding step of multi-value encoding the multi-value image data; and a second encoding step of binary encoding the binary image data of the portion to be binary encoded.

13. An image processing apparatus comprising:

input means for inputting binary image data representing one picture including a plurality of pixels, wherein a value of each pixel of the binary image data has one of only two possible states;

determination means for determining a portion to be non-reversibly encoded and a portion to be reversibly encoded from the one picture;

conversion means for converting the binary image data of the portion to be non-reversibly encoded into multi-value image data, wherein the value of each pixel of the multi-value image data has one of more than two possible states;

first encoding means for non-reversibly encoding the multi-value image data; and second encoding means for reversibly encoding the binary image data of the portion to be reversibly encoded.

14. An image processing method comprising:

an input step of inputting binary image data representing one picture including a plurality of pixels, wherein a value of each pixel of the binary image data has one of only two possible states;

a determination step of determining a portion to be non-reversibly encoded and a portion to be reversibly encoded from the one picture;

a conversion step of converting the binary image data of the portion to be non-reversibly encoded into multi-value image data, wherein the value of each pixel of the multi-value image data has one of more than two possible states;

a first encoding step of non-reversibly encoding the multi-value image data; and a second encoding step of reversibly encoding the binary image data of the portion to be reversibly encoded.

15. A computer readable medium which stores a computer-executable program for causing an apparatus to perform a method for encoding binary image data representing one picture including a plurality of pixels, wherein a value of each pixel of the binary image data has one of only two possible states, said method comprising:

a region division step of dividing the one picture into a pseudo halftone image portion and another portion;

a first encoding step of generating multi-value image data from the binary image data which indicates the pseudo halftone image portion, wherein the value of each pixel of the multi-value image data has one of more than two possible states, said first encoding step encoding the obtained multi-value image data; and a second encoding step of encoding the binary image data which indicates at least a part of the other portion.

16. A computer readable medium which stores a computer-executable program for causing an apparatus to perform a method for encoding binary image data representing one picture including a plurality of pixels, wherein a value of each pixel of the binary image data has one of only two possible states, said method comprising:

a determination step of determining a portion to be multi-value encoded and a portion to be binary encoded from the one picture;

a conversion step of converting the binary image data of the portion to be multi-value encoded into multi-value image data, wherein the value of each pixel of the multi-value image data has one of more than two possible states;

a first encoding step of multi-value encoding the multi-value image data; and a second encoding step of binary encoding the binary image data of the portion to be binary encoded.

17. A computer readable medium which stores a computer-executable program for causing an apparatus to perform a method for encoding binary image data representing one picture including a plurality of pixels, wherein a value of each pixel of the binary image data has one of only two possible states, said method comprising:

a determination step of determining a portion to be non-reversibly encoded and a portion to be reversibly encoded from the one picture;

a conversion step of converting the binary image data of the portion to be non-reversibly encoded into multi-value image data, wherein the value of each pixel of the multi-value image data has one of more than two possible states;

a first encoding step of non-reversibly encoding the multi-value image data; and a second encoding step of reversibly encoding the binary image data of the portion to be reversibly encoded.

* * * * *